No. 649,420.
F. BLINN.
OIL HOLE CLEANER.
(Application filed Sept. 2, 1899.)
Patented May 8, 1900.
(No Model.)
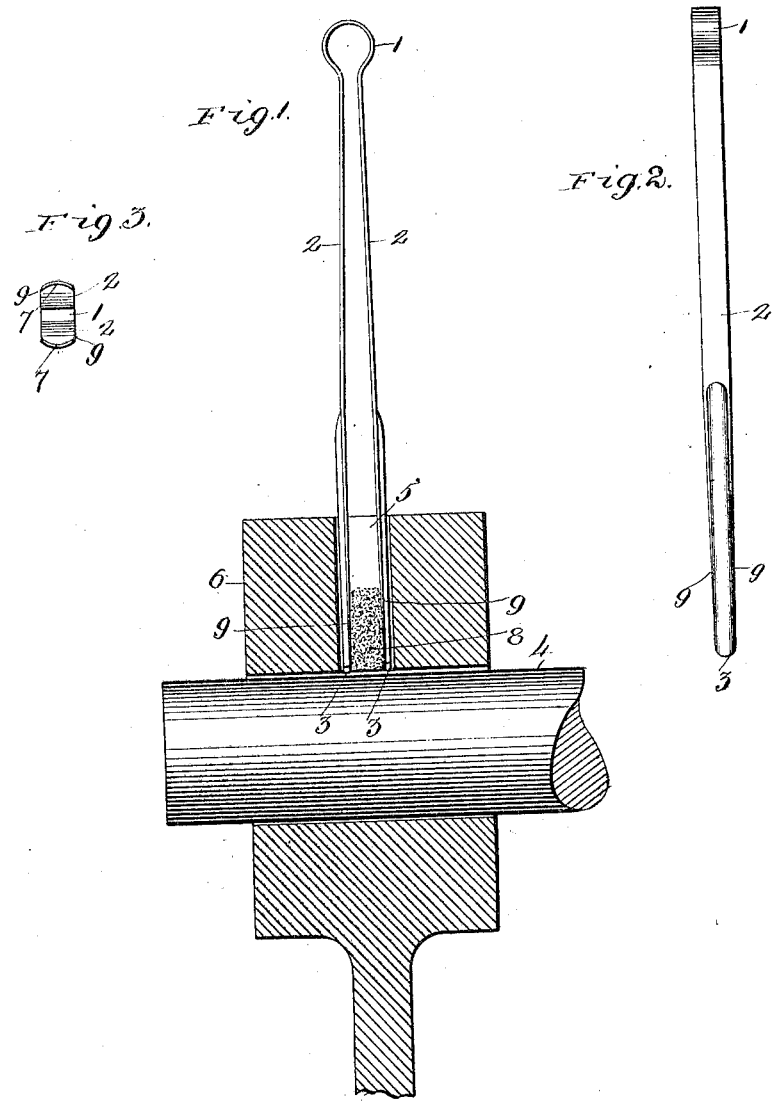
WITNESSES:
INVENTOR
Fritz Blinn.
BY
ATTORNEYS

UNITED STATES PATENT OFFICE.

FRITZ BLINN, OF TURKEY HILL, ILLINOIS, ASSIGNOR OF ONE-HALF TO MAX ZIMMERMANN, OF BELLEVILLE, ILLINOIS.

OIL-HOLE CLEANER.

SPECIFICATION forming part of Letters Patent No. 649,420, dated May 8, 1900.

Application filed September 2, 1899. Serial No. 729,360. (No model.)

*To all whom it may concern:*

Be it known that I, FRITZ BLINN, a citizen of the United States, residing at Turkey Hill, in the county of St. Clair and State of Illinois, have invented certain new and useful Improvements in Oil-Hole Cleaners; and I do hereby declare the following to be a full, clear, and exact description of the invention, such as will enable others skilled in the art to which it appertains to make and use the same.

My invention relates to improvements in oil-hole cleaners; and it consists in the novel combination and arrangement of parts, as will be hereinafter more particularly described and claimed.

In the drawings, Figure 1 is a front elevation of my complete invention as applied to an ordinary bearing. Fig. 2 is a side elevation of the same, and Fig. 3 is an end view.

The object of my invention is to construct a simple, durable, and practical device for cleaning or removing the dirt or other foreign material contained in the oil-holes of bearings, and especially those employed in threshing and farming machinery, as it is well known that such machinery is subjected to dirt and dust and that same finds its way into the oil-holes of the bearing, causing considerable annoyance; and the device consists of a hand implement in the form of two spring-arms which can be readily pressed together and inserted into the bearing or oil-hole thereof, after which the said arms are compressed or brought together, collecting and holding between them the dirt or foreign substance referred to, whereby the latter may be easily removed from the oil-hole of the bearing by holding said arms together until the implement is removed from the bearing.

Referring to the drawings, 1 represents the hand implement above referred to, which is constructed of a single piece of metal, forming a spring connecting-loop 1, from which extends two spring-arms 2 of suitable length. The lower ends of said arms 2 are rounded or curved, as shown at 3, which are adapted to come in contact with the shaft 4 at the bottom of the oil-hole 5 of the bearing 6, and, as clearly shown in the drawings, the said arms, are suitably depressed along their length to a suitable distance, forming concave surfaces 7, which are adapted to receive and hold the foreign substance 8 contained within the oil-hole 5, as clearly shown in Fig. 1. The opposite edges of each of the arms 2 where the same are depressed are provided with tapering edges 9, which operate to remove the foreign substance that adheres to the sides of the oil-hole in turning the implement after the same has been inserted into said hole.

In applying the implement the arms 2 are compressed sufficiently to permit the lower ends of the same to be inserted into the oil-hole, after which the same is forced downwardly to the shaft 4 and then turned within said oil-hole, in which operation all the foreign substance is cut away or removed from the sides of the said oil-hole, after which the arms 2 are further compressed holding the foreign substance between the same, and, while in this position, removed from the oil-hole with the dirt or other foreign substance between the lower ends of said arms.

Having fully described my invention, what I claim is—

An oil-hole cleaner, comprising a spring connecting-loop, two arms forming a continuation of the same, the lower ends of which are depressed forming two concave surfaces, at a suitable distance along their length, the opposite edges of said arms being tapering along the depressed portions of the same, forming cutting edges, and the lower ends of said arms being rounded, as and for the purpose described.

In testimony whereof I affix my signature in presence of two witnesses.

FRITZ BLINN.

Witnesses:
S. E. TINDALE,
E. W. MERZ.